United States Patent [19]

Moertel

[11] Patent Number: 5,047,195

[45] Date of Patent: Sep. 10, 1991

[54] METHOD OF MAKING A MOLDED ARTICLE

[76] Inventor: George B. Moertel, Rd. #3, Conneautville, Pa. 16406

[21] Appl. No.: 244,329

[22] Filed: Sep. 15, 1988

[51] Int. Cl.$^5$ ............................................. B29D 5/00
[52] U.S. Cl. ...................................... 264/166; 264/167; 264/297.3; 264/328.8; 264/328.12; 264/327; 425/545; 425/572; 425/575; 425/814
[58] Field of Search ...................... 264/166, 167, 328.8, 264/328.11, 328.12, 328.6, 297.2, 297.3, 327, 212, 216; 425/814, 545, 555, 572, 575, 373

[56] References Cited

U.S. PATENT DOCUMENTS

| | | | |
|---|---|---|---|
| 2,102,328 | 12/1937 | Morin et al. | 425/545 |
| 2,470,402 | 5/1949 | Jobst | 425/555 |
| 3,758,657 | 9/1973 | Menzin et al. | 264/166 |
| 3,765,816 | 10/1973 | Dobbins | 425/575 |
| 3,809,518 | 5/1974 | Lloyd et al. | 425/555 |
| 3,888,615 | 6/1975 | Ulmschneider et al. | 425/575 |
| 4,176,149 | 11/1979 | Moertel | 264/166 |
| 4,182,600 | 1/1980 | Moertel | 425/814 |
| 4,339,408 | 7/1982 | Jenkins | 425/555 |
| 4,350,656 | 9/1982 | Moertel | 264/166 |
| 4,386,043 | 5/1983 | Takeshima | 264/328.12 |

*Primary Examiner*—Jeffery Thurlow
*Assistant Examiner*—Mathieu Vargot
*Attorney, Agent, or Firm*—Alexander R. Field

[57] ABSTRACT

A method of molding articles including the steps of continuously moving a forming mold and a band-like molding member in a first and second endless path, respectively, engaging the respective mold and member through a region of engagement to form a continuous open-ended molding cavity; injecting hardenable material into the cavity; intermixing and compacting the hardenable material before hardening into an article and then disengaging the mold and band before removing the article.

10 Claims, 2 Drawing Sheets

METHOD OF MAKING A MOLDED ARTICLE

BACKGROUND OF INVENTION

1. Field of the Invention

This invention relates to an article molded in continuous strip form and the method and apparatus for the manufacture of the same.

2. Description of the Prior Art

The prior art, as exemplified by U.S. Pat. Nos. 4,137,034; 4,350,656; and 4,352,654, contains a number of methods and apparatus for continuously molding individual articles or articles connected by thin runners. These prior art methods and apparatus incorporate continuously rotating cavity wheels and continuous bands for forming the walls of discrete cavities into which the molding material is injected. However, these prior art molding methods and apparatus were limited to molding individual elements or elements interconnected by intentional break zones to separate or snap-off individual elements.

SUMMARY OF THE INVENTION

The invention is summarized as a molded article, and the method and apparatus for making the same, that includes a body member formed in a continuous molding process by injecting hardenable material through spaced apart openings communicating with a continuous open-ended cavity moving in a given path. The sprues, formed in each opening and molded integrally with the body member upon hardening of the hardenable material, are severed from the body after removal of the body member from the continuous cavity. Hardenable material in melt form is continuously injected through a plurality of openings into the continuously moving open-ended cavity to initially fully occupy the cavity, with the foremost side of the material contained within the open-ended moving cavity, located upstream of said openings. As the moving cavity transports the material downstream, the outer skin cools and the volume of the melt shrinks whereby the downstream openings inject more hardenable material melt into the moving cavity to compensate for the shrinkage so that the final injection of melt to form the article fully occupies the cavity. The molded article is removed when the continuously moving members forming the continuous open cavity are separated.

An object of this invention is a molded article that is readily formed of hardenable material in a continuous molding process.

Another object of this invention is to sequentially inject hardenable material into a continuously moving open cavity that has one open-end, the speed of the members forming the open cavity being sufficient to maintain the hardenable material within the continuously moving open-ended cavity.

Still another object of this invention is to thoroughly intermix the hardenable material and accommodate pressure variations within the system when molding an article of hardenable material.

One advantage of the invention is that molded articles manufactured of hardenable material can be manufactured in continuous string form at greatly increased productivity Other objects, advantages and features of the invention will be apparent from the following description of the preferred embodiments taken in conjunction with the accompanying drawings.

DETAILED DESCRIPTION

Figure 1:
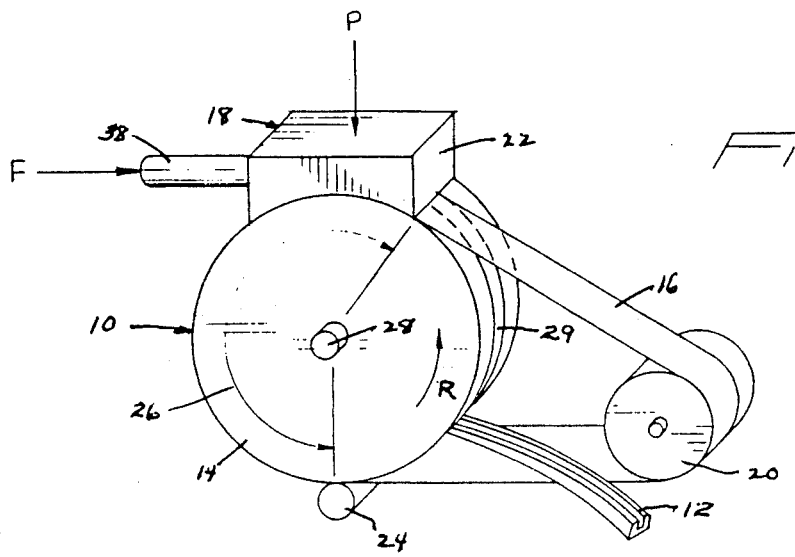
FIG. 1 is a perspective of an apparatus constructed in accordance with the invention.
Figure 2:
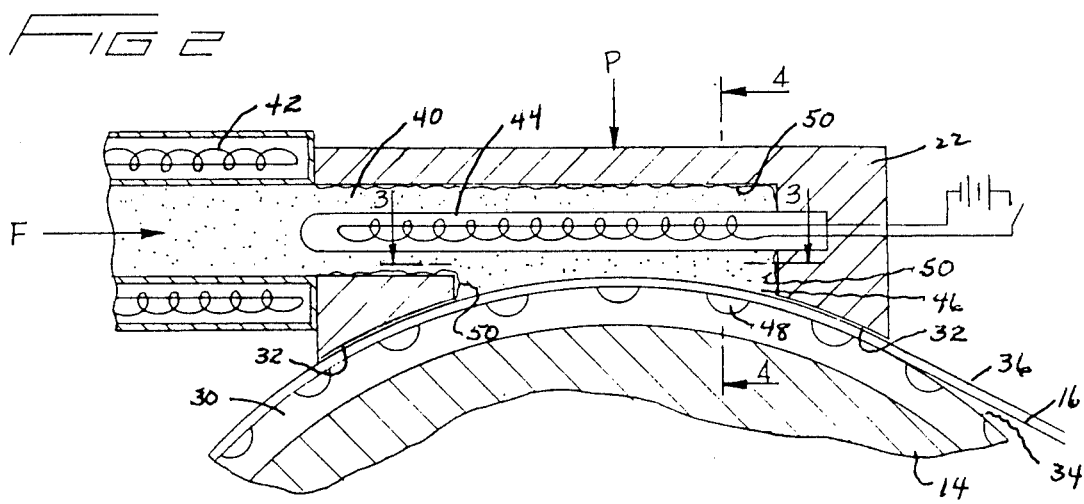
FIG. 2 is a side cross-section view of a portion of the apparatus for continuously molding an article.
Figure 3:
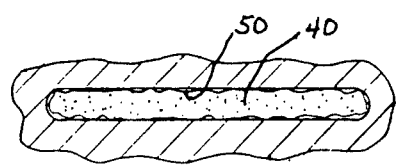
FIG. 3 is a cross-section view taken at line 3—3 in FIG. 2 of a portion of the molding apparatus.
Figure 4:
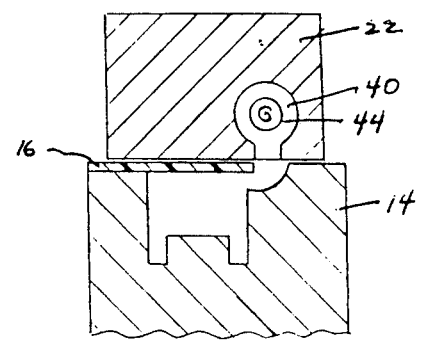
FIG. 4 is a front cross-section view taken at line 4—4 of FIG. 2.

As illustrated in FIG. 1, an apparatus, indicated generally at 10, for continuously molding an article 12 includes a forming mold wheel 14, a continuous band 16 and an injection mechanism 18. Band 16 extends around wheel 14 and has circumference that is larger than the periphery of wheel 14, whereby band 16 passes about a guide wheel 20, to disengage band 16 from wheel 14 for a portion of its endless path. Injection mechanism 18 includes a shoe 22 to engage and force band 16 against wheel 14 within an angle of engagement 26 defined by injection mechanism 18 and roller 24. Motor means 28 is drivingly connected to cavity wheel 14 for continuously rotating wheel 14 as well as continuously moving band 16 in an endless path with both wheel 14 and band 16 engaged and moving in the same direction past the injection mechanism 18 and roller 24. Wheel 14 and band 16, when engaged together in the angle of engagement 26, to cover channel 29, located in the periphery of wheel 14, form a continuous open ended molding cavity 30 for receiving molding materials injected by mechanism 18 and then hardened within the cavity to continuously form the molded article.

Figure 5:
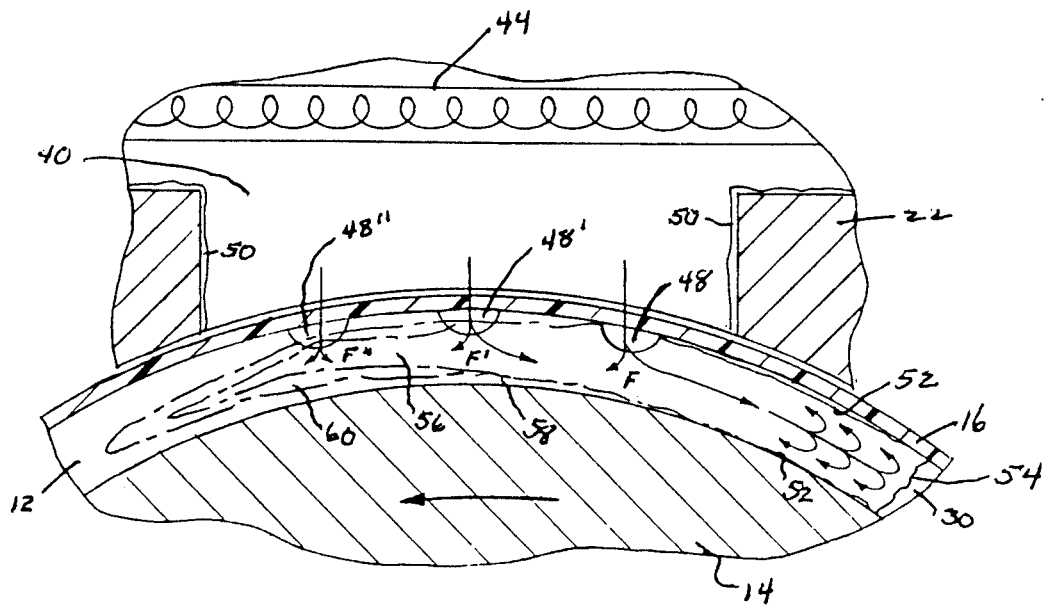
FIG. 5 is an enlarged view of a portion of the cross-section view of FIG. 2.
Figure 6:
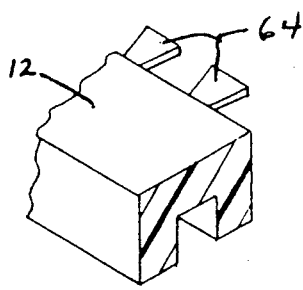
FIG. 6 is an enlarged perspective view of a product continuously molded on the apparatus of FIG. 1.
Figure 7:
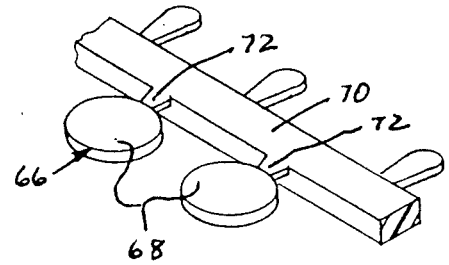
FIG. 7 is an enlarged perspective view of another product that can be continuously molded on this apparatus.
Figure 8:
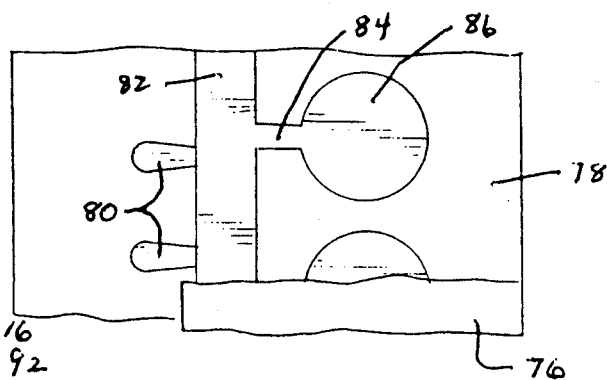
FIG. 8 is a plan view of the injection molding apparatus of FIGS. 2 and 5.

The molding apparatus shown in FIGS. 1-5 is designed for molding a continuous length article having a substantially U-shape in cross-section as shown in FIG. 6; whereas, the variation of FIGS. 7 and 8 is designed to mold in continuous length a specific product that can, in subsequent steps, be separated into individual elements. Many other variations can be devised for molding various articles.

The apparatus of FIGS. 1-5 includes a continuous annular channel 29 located centrally in the periphery of wheel 14 that is driven by motor 28 to rotate in the direction R. Cavity 30, as shown in the embodiment of FIGS. 1-5, is an open continuous elongated chamber of uniform cross-section and for purposes of example only will be described as an inverted U-shape. Injection mechanism 18 includes a shoe 22 whose lower surface 32 is curved to closely fit upon the outermost peripheral surface 34 of wheel 14 as well as the peripheral surface 36 of moving band 16 wrapped about wheel 14. Pressure P applied to shoe 22 maintains the shoe in sliding engagement with band 16 as plastic resin melt F from an outside source enters through conduit 38 to interior chamber 40 of shoe 22. Electrical heater element 42 located in the walls of conduit 38 maintains the melt F within conduit 38 in a substantially fluid state.

An electrical cylinder heater 44, centrally located within chamber 40, is positioned closely adjacent to the outlet 46 from shoe 22, to reheat the melt immediately prior to the melt entering annular cavity 30 as the melt will become slightly cooler and more viscous in moving from conduit 38 to chamber 40.

A plurality of spaced apart openings 48 are located on the periphery of wheel 14 to form a connecting passage between chamber 40 in shoe 22 and annular cavity 30 in wheel 14. As wheel 14 rotates, band 16 moves with the wheel beneath shoe 22 and encloses cavity 30 on all sides throughout the angle of engagement 26, until band 16 moves past roller 24, at which point, band 16 separates from wheel 14 and annular channel 29 is uncovered.

In operation of the apparatus of FIGS. 1-5, flowable plastic melt F is injected into conduit 38 from a supply not shown, where melt F is heated by heater 42 to retain its fluid-like character. From conduit 38, melt F enters chamber 40 of shoe 22 and, as it surrounds and flows past cylindrical heater 44, melt F is heated to a higher temperature that further reduces its viscosity. In so heating melt F in chamber 40, a thin coating of semi-solid plastic 50 overlays the interior walls of chamber 40 as the temperature of the interior walls ar cooler than the temperature of the resin within chamber 40. Cavity wheel 14 driven by motor 28 and band 16 are guided into engagement beneath shoe 22 to form and enclose annular cavity 30 through the angle of engagement 26.

The plastic resin or melt F, recently heated by heater 44, passes through outlet 46 and through opening 48 from chamber 40 to cavity 30 where it flows upstream against the direction of movement of cavity 30. Another coating 52, similar to coating 50, is formed on the inner walls of cavity 30 as melt F flows upstream of shoe 22 and openings 48. Coatings 50 and 52 aid in the movement of melt F through the system because the resistance to the flow between the freely flowing plastic resin F and coatings 50 and 52 is substantially less than the resistance to the flow between plastic melt F and the interior surface of any portion of conduit 38, chamber 40 and cavity 30. Heating plastic melt F to a higher temperature by the use of heater 44 at outlet 46 of chamber 40 and prior to its passage through openings 48 into cavity 30, provides a lower resistance to the flow between the melt F and the interior surfaces of melt coating 52.

As shown in FIG. 5, melt F downstream of openings 48, 48' and 48" connecting outlet 46 of shoe 22 has fully occupied cavity 30; and, because of the rotation of wheel 14 with band 16, is now cooling and solidifying into an article 12 of solid plastic resin and is moving rapidly away from shoe 22. Thus, newly heated plastic resin melt F that enters cavity 30 through upstream opening 48 cannot flow downstream against solid plastic resin forming article 12; and, because it is under pressure from injection mechanism 18, flows upstream.

However, band 16 and channel 29 forming cavity 30 have surfaces which are relatively cool as they come together beneath shoe 22 and because of their linear speed, melt F injected through opening 48 can only travel a short distance upstream before melt F is turned back on itself. It must be appreciated that cavity 30 is moving at a relatively high speed past shoe 22 so that the upstream flow of melt F stops at a relatively constant distance from shoe 22 as the volume of melt being injected into cavity 30 is almost the same as the volume of melt moving past opening 48. Melt F then forms, in effect, a foremost side 54 past which melt F cannot flow further upstream.

Because melt F is injected into an open-ended cavity whose sides are continuously moving in a direction past the shoe through which the melt is injected, the melt is subject to turbulent flow which intermixes the melt resulting in a quality product. Importantly, use of an open-ended cavity system, with its movable upstream face, diminishes the pressure surges that normally occur when a fixed volume of plastic melt is injected by positive displacement means into a cavity system. Accordingly, foremost side 54 changes position relative to upstream opening 48 as it slightly advances and retreats as a result of pressure variations.

The outer surfaces of melt F, upstream of the first opening 48 in wheel 14, engage the cool interior surfaces of band 16 and channel 29 to cool and solidify to form a skin or coating 52 having a greater viscosity approaching solidification. More of the melt forming skin 58 cools to a semi-solid state as the hardenable material moves past opening 48 towards opening 48' so that semi-solid skin 58 becomes thicker and the volume of fluid melt material forming melt core 56 enclosed within skin 58 is reduced as the hardenable material progressively cools from its outer surfaces to the center of melt core 56.

For purposes of illustration only, skin 58 which envelopes core 56 of melt F injected through opening 48 of FIG. 5, is shown as having an increased thickness as the hardenable material enclosed within cavity 30 moves past openings 48, 48' and 48".

Additional plastic melt F' is injected into cavity 30 through opening 48'. Melt F' will enter melt core 56 where it will exert pressure outwardly against the inner surface of skin 58.

In like manner, additional melt can be injected through opening 48" to further pressurize core 56.

As shown in FIG. 5 the melt injected through opening 48 forms skin 58 which becomes thicker as it cools and moves downstream of opening 48 where it eventually becomes solid to form article 12. Similarly, to further illustrate the process, a semisolid envelope 60 of hardenable material is formed intermediate skin 58 and melt core 56. It is to be understood that newly injected material entering openings 48' and 48" will exert pressure on the material forming the article which pressure is directed from the inner core outwardly towards the skin. Because the melt is injected substantially internally in this continuous molding process, the outer surface of the final product has a blemish free exterior.

The length of the arrows showing the direction of flow of melt F, F' and F" is somewhat proportional to the volume of material injected through the respective openings 48, 48' and 48".

The above described sequence of operation of the apparatus as wheel 14 and band 16 pass beneath shoe 22 is continuous and can involve a wheel 14 that has many more openings 48, 48', and 48" communicating with outlet 46 of chamber 40 than is shown. It should also be understood that openings 48, 48' and 48" can be eliminated and a plurality of openings (not shown) can be located in band 16 to directly inject melt from chamber 40 through the openings in the band and into cavity 30, to obtain the results as described herein.

Article 12 cools to solid form throughout its travel through the angle of engagement 26 and once past roller 24 can be removed from annular cavity 30 when band 16 separates from wheel 14 and before band 16 passes about roller 24. The resulting article can be wound upon a reel or cut into given lengths (not shown).

As shown in FIG. 6, article 12 includes equally spaced apart sprues 64 which are formed by the melt F remaining in opening 48 once wheel 14 moves past shoe 22. Sprues 64 can be used to carry or position article 12 in subsequent operations.

FIGS. 7 and 8 show another embodiment of an article 66 that can be made by this method and on this apparatus. Article 66 has a body 68, that for representation is circular in configuration. In this embodiment, a continuous member 70 formed in open-ended channel 82 of FIG. 8 extends along one side and has a connecting sprue 72 extending between article 68 and member 70. Similarly, a connecting element (not shown) can interconnect adjacent articles 66 whereby a plurality of articles are carried on member 70 in a uniform repetitive manner for subsequent operations.

As shown in FIG. 8, band 76 overlies wheel 78 with openings 80 exposed to accept melt under the edge of band 76. It has been found that melt will pass through openings 80, enter open-ended channel 82 that will form continuous member 70, flow into connection 84 that will form element 72, thence flow into channel extension 86 to form body 68. Again, the flow of melt in open-ended channel 82 will be turbulent to intermix the melt both in channel 82, as well as channel extension 86. The injecting of melt into open-ended channels, such as 82, will operate and perform in a manner similar to that described above with reference to article 12 to obtain the desired results.

Figure 9:
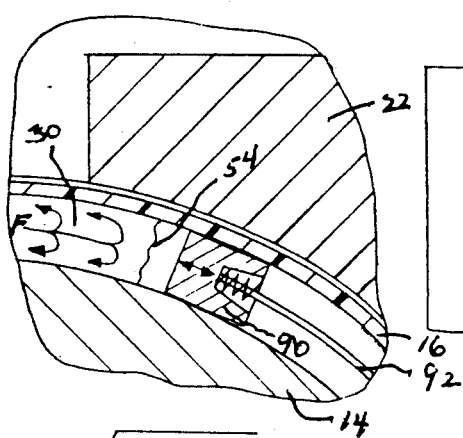
FIG. 9 is a view similar to FIG. 2 of another variation of the invention.

In FIG. 9, there is shown still another embodiment of the apparatus in which a blocking member 90, resiliently mounted to move arcuately on member 92, is located in cavity 30 upstream of face 54 of melt F. Blocking member 90 moves within cavity 30 and has a cross-sectional configuration that will substantially fill cavity 30 so that it will slidingly engage the inner surfaces of cavity 30 including lower surface 32 of band 16. If extreme pressure surges or a very low viscosity melt is injected into cavity 30, face 54 can advance upstream of its normal range, but resiliently mounted blocking member 92 will inhibit such movement by adjusting its position in response to the change in pressure and move accordingly within cavity 30 to prevent any melt from being ejected from cavity 30 upstream of the engagement of band 16 and wheel 14.

The foregoing invention is useful for molding articles that are dimensionally correct with a uniform composition throughout. Furthermore, the product in continuous form manufactured on this apparatus and method readily lends itself to subsequent manufacturing operations. Also, the entire apparatus can be readily modified to incorporate a heated wheel and band operating at a temperature suitable for using a thermo-setting type plastic.

While not shown in the drawings, it is to be understood that the inner surface of band 16 and/or channel 29 can have either raised or recessed surface configurations resulting in recessed or raised surface configurations in the article.

Since many modifications, variations and changes in detail may be made to the embodiments described above and shown in the accompanying drawings, it is intended that all matter described in the foregoing description and shown in the drawings be interpreted as illustrative and not in a limiting sense.

What is claimed is:

1. A method of continuously molding articles, comprising the steps of:
   continuously moving the outer peripheral portion of a forming mold having a continuous channel with a plurality of spaced apart openings thereto, said channel extending the length of said mold in a first endless path defined by the outer peripheral portion;
   continuously moving a band-like molding member in a second endless path;
   continuously engaging a portion of the band-like molding member and the outer peripheral portion of the forming mold as they pass together through a region of engagement to form a continuously moving open-ended molding cavity;
   continuously injecting hardenable material through a group of said openings and into said molding cavity adjacent an initial section of engagement of said band-like molding member and said forming mold;
   intermixing hardenable material injected through foremost openings of said group of openings located closest to said initial section of engagement to flow toward said open end of said cavity where the speed of said mold and said band-like member maintains said injected hardenable material within said molding cavity in advance of said openings;
   compacting said hardenable material injected through said foremost openings by hardenable material injected through other openings of said group of openings as said previously injected hardenable material moves past said group of openings within said cavity;
   progressively hardening said hardenable material in the continuously moving molding cavity to form an article in solid form;
   continuously disengaging the band-like molding member from the outer continuous peripheral portion of the forming mold during their movement away from the region of engagement; and,
   removing the article during the disengaging step.

2. A method as claimed in claim 1 wherein the step of injecting includes injecting hardenable material through openings in said band-like molding member.

3. A method as claimed in claims 1 or 2 wherein the step of intermixing includes the step of cooling an outer layer of said hardenable material injected through said foremost openings to enclose an innermost core of said hardenable material.

4. A method as claimed in claim 1 or 3 wherein the step of compacting includes the step of injecting hardenable material through said other openings into the innermost core of that material previously injected through said foremost openings to intermix and direct pressure outwardly against the outer layer of said previously injected hardenable material.

5. A method as claimed in claims 1 or 2 that includes the step of reheating said hardenable material immediately prior to entering said molding cavity.

6. A method as claimed in claim 1 or 2 wherein said forming of said open-ended molding cavity includes:
   forming inner wall portions of said open-ended molding cavity from the wall portions of the continuous channel of the forming mold;

forming outer wall portions of said open-ended molding cavity from the inner surfaces of said band-like molding member; and, forming a closed end wall portion of said open-ended molding cavity by the hardening of said, hardenable material.

7. A method as claimed in claim 6 wherein the step of forming outer wall portions includes forming recesses and raised portions in said molding cavity by forming projections and recesses, respectively, on said band-like molding member.

8. A method as claimed in claim 6 wherein said forming of said open-ended molding cavity includes forming a stable upstream face on said hardenable material by the movement of said mold and said band-like member acting on said newly injected hardenable material.

9. A method as claimed in claim 1 that includes the step of resiliently blocking the upstream portion of said open-ended cavity to inhibit pressure surges in the injected hardenable material.

10. A method as claimed in claim 6 that includes the step of simultaneously forming individual cavities in communication with said open-ended molding cavity through said region of engagement for accepting hardenable material.

* * * * *